United States Patent
Briese

(10) Patent No.: US 8,147,079 B2
(45) Date of Patent: Apr. 3, 2012

(54) DIFFUSER TO BE DETACHABLY MOUNTED ON A REFLECTOR SCREEN OR THE LIKE

(76) Inventor: Hans-Werner Friedrich Briese, Hamburg (DE)

( * ) Notice: Subject to any disclaimer, the term of this patent is extended or adjusted under 35 U.S.C. 154(b) by 154 days.

(21) Appl. No.: 12/666,475

(22) PCT Filed: Jun. 25, 2008

(86) PCT No.: PCT/EP2008/005436
§ 371 (c)(1),
(2), (4) Date: Dec. 23, 2009

(87) PCT Pub. No.: WO2009/000556
PCT Pub. Date: Dec. 31, 2008

(65) Prior Publication Data
US 2010/0188752 A1  Jul. 29, 2010

(30) Foreign Application Priority Data
Jun. 28, 2007  (DE) .................... 20 2007 009 232 U

(51) Int. Cl.
*G03B 15/02*  (2006.01)

(52) U.S. Cl. .............................. 362/16; 362/18; 362/355

(58) Field of Classification Search .................... 362/16, 362/17, 18, 352, 355, 356, 360, 449, 450, 362/455
See application file for complete search history.

(56) References Cited

U.S. PATENT DOCUMENTS

| 2,007,040 | A | * | 7/1935 | Doane .......................... 362/455 |
| 4,052,607 | A | | 10/1977 | Larson |
| 4,504,888 | A | * | 3/1985 | Rosenthal ....................... 362/18 |
| 4,594,645 | A | | 6/1986 | Yutaka |
| 4,616,293 | A | | 10/1986 | Baliozian |
| 6,709,121 | B1 | | 3/2004 | Lowe et al. |

FOREIGN PATENT DOCUMENTS

| CA | 1 257 997 A1 | 8/1989 |
| DE | 8702694 | 6/1987 |
| DE | 69809374 T2 | 4/2003 |
| DE | 20312657 U1 | 11/2003 |
| EP | 0 225 105 A2 | 6/1987 |
| JP | 09213119 A * | 8/1997 |
| WO | WO-02/19024 | 3/2002 |
| WO | WO-2005/045517 | 5/2005 |

OTHER PUBLICATIONS

International Search Report and Written Action from the International Search Office, PCT/EP2008/005436, dated Nov. 26, 2008 with English translation.
German Search Report Dated Apr. 1, 2008 With an English Translation.

* cited by examiner

*Primary Examiner* — Y My Quach Lee
(74) *Attorney, Agent, or Firm* — Venable LLP; Robert Kinberg

(57) ABSTRACT

A diffuser for releasable fastening to a reflector screen having screen spokes, includes a diffuser element and a fastening apparatus to fasten the diffuser element to the reflector screen. The fastening apparatus has a plurality of fastening elements constructed and adapted to receive corresponding screen spokes of the reflector screen. The fastening elements are constructed to apply a spring action and each fastening element has an opening to receive one screen spoke.

12 Claims, 3 Drawing Sheets

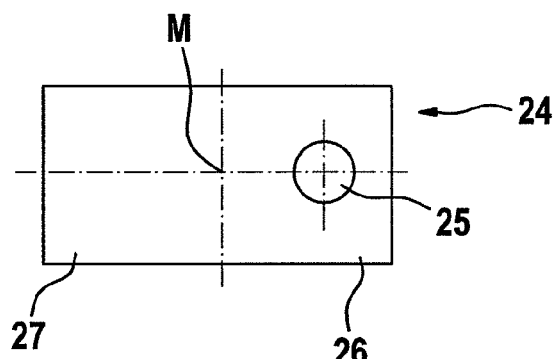
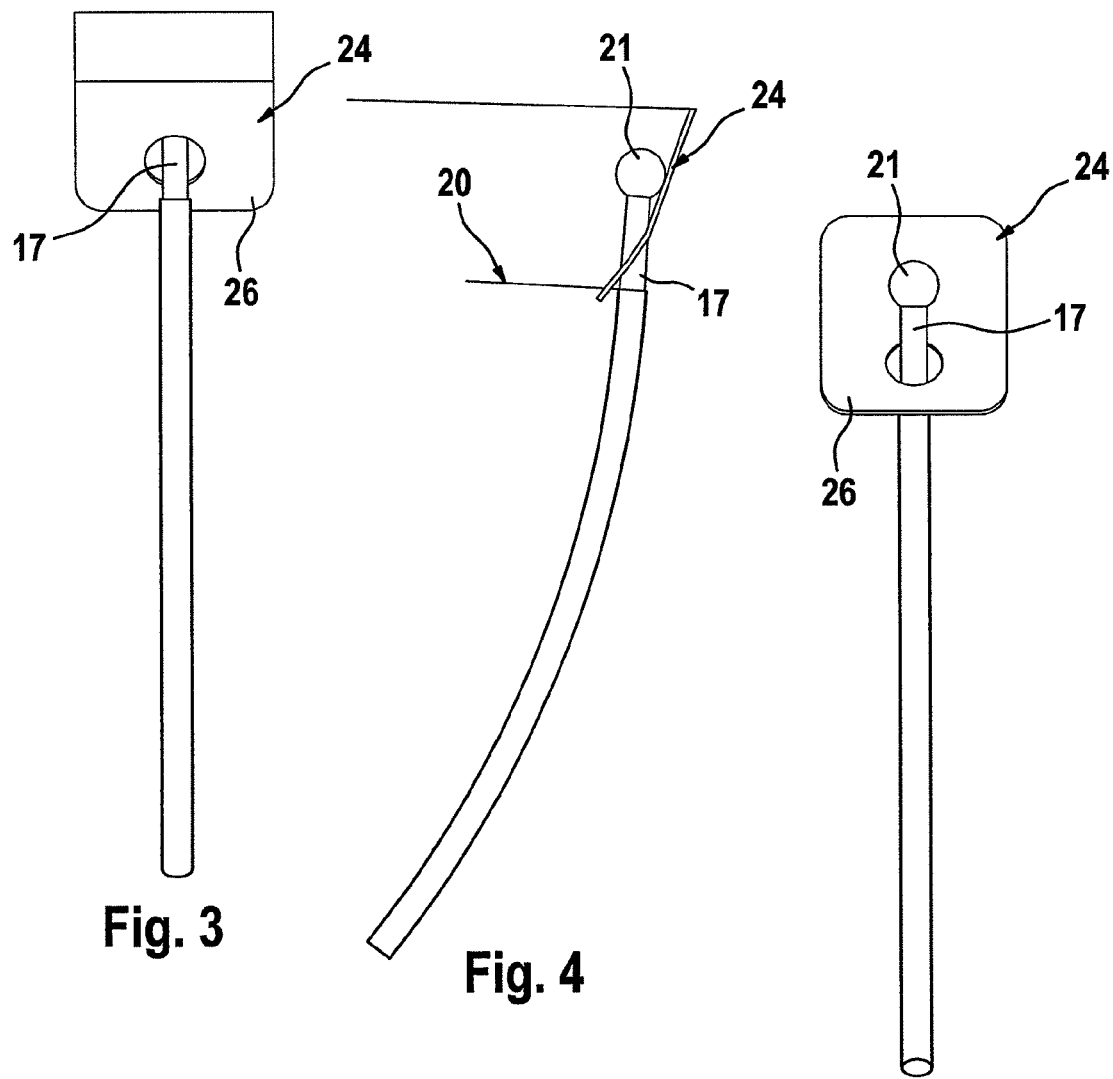
Fig. 2
Fig. 3
Fig. 4
Fig. 5

DIFFUSER TO BE DETACHABLY MOUNTED ON A REFLECTOR SCREEN OR THE LIKE

This application is a 35 U.S.C. §371 filing of International Patent Application No. PCT/EP2008/005436 filed Jun. 25, 2008, designating the United States and claiming the benefit of German Application No. 20 2007 009 232.6 filed Jun. 28, 2007.

BACKGROUND OF THE INVENTION

The invention concerns a diffuser for releasable fastening to a reflector screen or the like, comprising a diffuser element as well as fastening means for fastening the diffuser element to the reflector screen or the like.

Diffusers of this kind are used in particular in the field of photography or film, preferably in connection with a reflector screen or the like. By means of the reflector screens, preferably different light and/or shadow effects and images are produced or formed. The diffusers, which are arranged in the region of a light outlet opening of the reflector screen, are used in particular to scatter light. A diffuser obtains the result, for example, that the transitions between light and shadow are altered. In particular, the transition from light to shadow and vice versa becomes more blurred. In this connection, so-called soft light is also spoken of. Furthermore, disturbing sheens such as can occur on smooth surfaces, for example, can also be reduced with diffusers.

The diffusers are releasably fastened to the reflector screens. To vary the diffuser effect, the diffusers can be exchanged. The diffusers are removable for folding the reflector screens as well. Diffusers which have hook-and-pile fasteners, studs or the like as the fastening means are known. Specifically, the diffuser elements are laid over the light outlet opening of the reflector screen and, using the fastening means, connected thereto in snug-fitting relationship. However, the previous diffusers have the drawback that firstly they virtually close the light outlet opening, which leads to heat accumulation within the reflector screen when the lamp is switched on. Secondly, the known diffusers crease due to lack of tension, leading to uneven or irregular illumination.

SUMMARY OF THE INVENTION

It is therefore the object of the present invention to provide an easy-to-handle diffuser which avoids the above drawbacks.

This object is achieved by a diffuser of the kind mentioned hereinbefore by the fact that the fastening means has several fastening elements constructed and designed for receiving corresponding screen spokes of the reflector screen. Usually, these screen spokes project beyond the light outlet opening of the reflector screen. As a result it is possible to position the diffuser element at a distance in front of the light outlet opening of the reflector screen, so that the heat generated by the or each lamp can circulate. The service life and durability in particular of the reflector screens and associated lamps can therefore be greatly improved.

Preferably, several plate-like fastening elements are evenly distributed over the circumference of the diffuser element and fastened thereto. By this means, uniform fastening or "suspension" on the screen spokes is guaranteed in an effective manner, leading to crease-free tensioning of the diffuser element.

An appropriate development provides that each fastening element is designed as a tensioning element. This assists reliable mounting of the diffuser on the reflector screen without creasing.

Advantageously, each fastening element is designed as a single-piece element which applies a spring action, so that uniform tension can easily be applied to the diffuser element.

A preferred embodiment is distinguished in that the fastening elements are preferably rectangular plates, the plates having an opening for receiving one screen spoke each. As a result, the diffuser is made particularly easy to handle, that is, in particular when mounting it on the reflector screen and removing it.

Preferably, the opening is arranged eccentrically in relation to the centre M of the fastening element. As a result, a leverage which assists the spring action is defined, such that the diffuser element is tensioned virtually in cantilever relationship without direct contact with the reflector screen.

BRIEF DESCRIPTION OF THE DRAWINGS

Further appropriate and/or advantageous features and designs are apparent from the subsidiary claims and the description. A particularly preferred embodiment is described in more detail with the aid of the attached drawings. The drawings show:

FIG. 2 a top view of a single fastening element,

FIG. 3 an exterior view of a fastening element fitted on a screen spoke,

FIG. 4 a side view of the arrangement shown in FIG. 3,

FIG. 5 an interior view of the fastening element fitted on the screen spoke, and FIG. 6 a great enlargement of a connection between the diffuser element and a fastening element in a state not mounted on the reflector screen.

BRIEF DESCRIPTION OF THE EMBODIMENTS

The diffuser described below is particularly suitable for mounting on a reflector screen or the like. Naturally, the diffuser can also be used elsewhere, e.g. with lightning equipment, etc.

Figure 1:
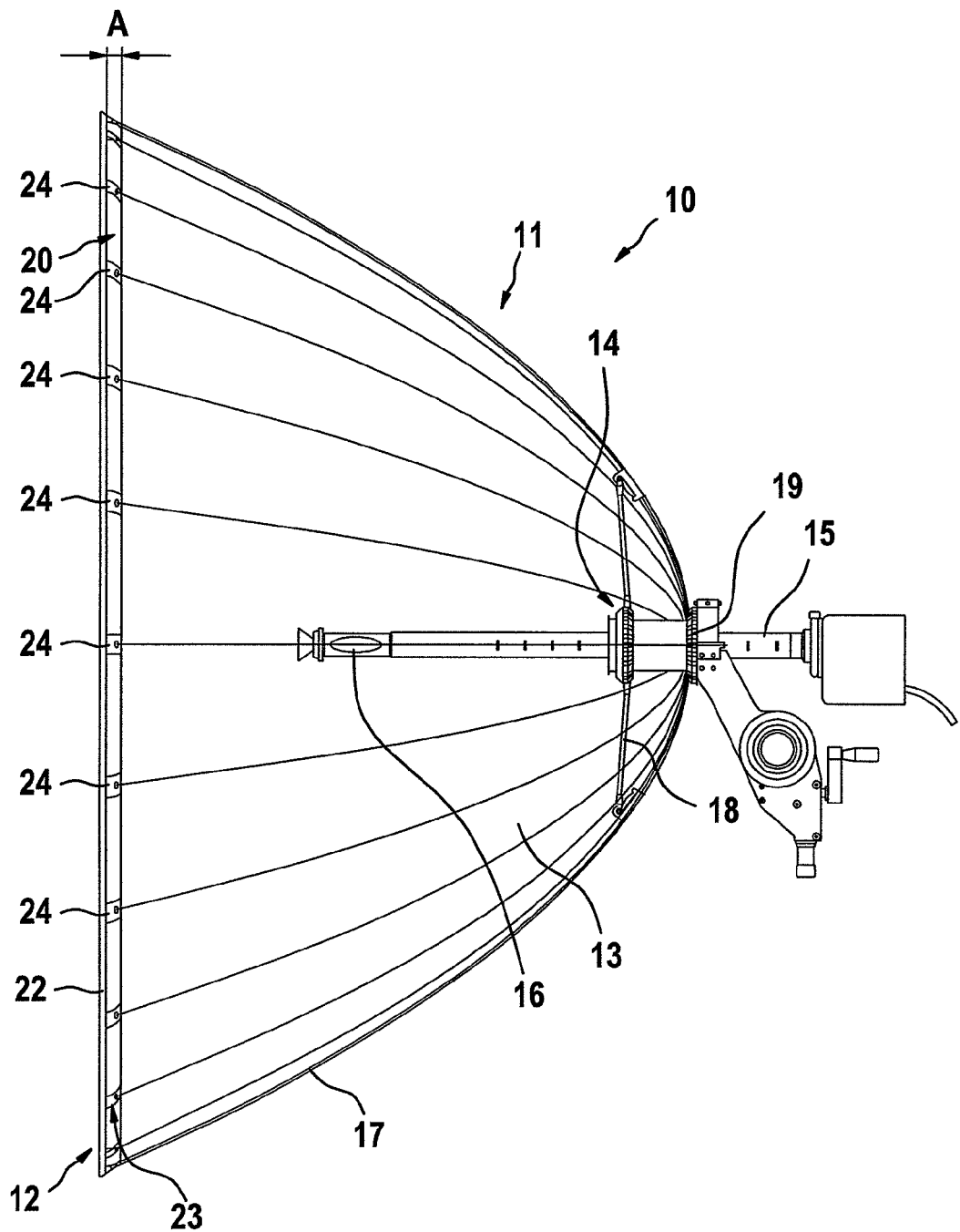
FIG. 1 a side view of a reflector screen with a pretensioned diffuser.

For a better understanding of the invention, first an arrangement 10 consisting of a reflector screen 11 and a diffuser 12 is described with reference to FIG. 1. The structure of the reflector screen 11 can vary. Purely by way of example, the reflector screen 11, which can be openable or rigid, has a reflection element 13, a supporting and tensioning structure 14 and a carrier element 15 having at least one lamp 16. The supporting and tensioning structure 14 comprises screen spokes 17 and expanding spokes 18. The screen spokes 17 are inserted in external seams of the reflection element 13 and extend from a bearing body 19 into the region of a light outlet opening 20 of the reflector screen 11. The screen spokes 17, which are evenly distributed over the circumference of the light outlet opening 20, project beyond the light outlet opening 20. Optionally, the screen spokes 17 can be provided at the free end with an e.g. spherical closure cap 21 or the like. In other embodiments not shown, the construction of the reflector screen 11 can be completely different. It is crucial that in the region of the light outlet opening 20 a fastening means, which in the embodiment shown is formed by the projecting screen spokes 17 with the spherical closure caps 21, projects beyond the light outlet opening 20.

The diffuser 12 for releasable fastening to the reflector screen 11 or the like comprises a diffuser element 22 and fastening means 23 for fastening the diffuser element 22 to the reflector screen 11. The fastening means 23 has several fastening elements 24 which correspond to the fastening means of the reflector screen 11. In particular, the fastening elements 24 are constructed and designed for receiving one screen spoke 17 each of the reflector screen 11. The plate-like fastening elements 24 are evenly distributed over the circumference of the diffuser element 22 and fastened thereto. For fastening, various common options are possible. Particularly preferably, the fastening elements 24 are stitched to the diffuser element 22, which can be made of e.g. films, glass fibres, textile fibres or combinations thereof and other materials.

The number of fastening elements 24 can vary, but preferably corresponds to the number of corresponding screen spokes 17 of the associated reflector screen 11. Each fastening element 24 is designed as a tensioning element. This can be achieved firstly by separate tensioning mechanisms. But preferably the fastening elements 24 are "inherently" tensionable by a suitable choice of materials. In other words, each fastening element 24 is designed as a single-piece element which applies a spring action. For this purpose the fastening elements 24 are preferably made of a flexible material. Polycarbonate proved to be particularly suitable. But naturally other materials or combinations of materials are possible too, in particular thin spring steel sheets or the like as well.

A single fastening element 24 can be seen in FIG. 2. The preferably rectangular and flat plates, which can also have almost any other shape, have an opening 25 which is designed for receiving one screen spoke 17 each. The opening 25 is designed in such a way that the fastening element 24 can be fitted on the screen spoke 17. The position of the opening 25 can vary, but is preferably not at the centre M of the fastening element 24. It can be seen in FIG. 2 that the opening 25 is arranged asymmetrically. This means that the opening 25 is arranged eccentrically in relation to the centre M of the fastening element 24. By this means, the fastening element 24 is virtually divided into a receiving section 26, which comprises the opening 25, and a holding section 27, which is stitched to the diffuser element 22. The diameter of the bore forming the opening 25 is preferably slightly larger than the largest cross-section of the screen spoke 17 or closure cap 21. Hence on the one hand easy fitting is guaranteed, and on the other hand unwanted slipping off is prevented. The fastening element 24 can also be designed as a sleeve with a receptacle for a screen spoke or otherwise.

Figure 6:
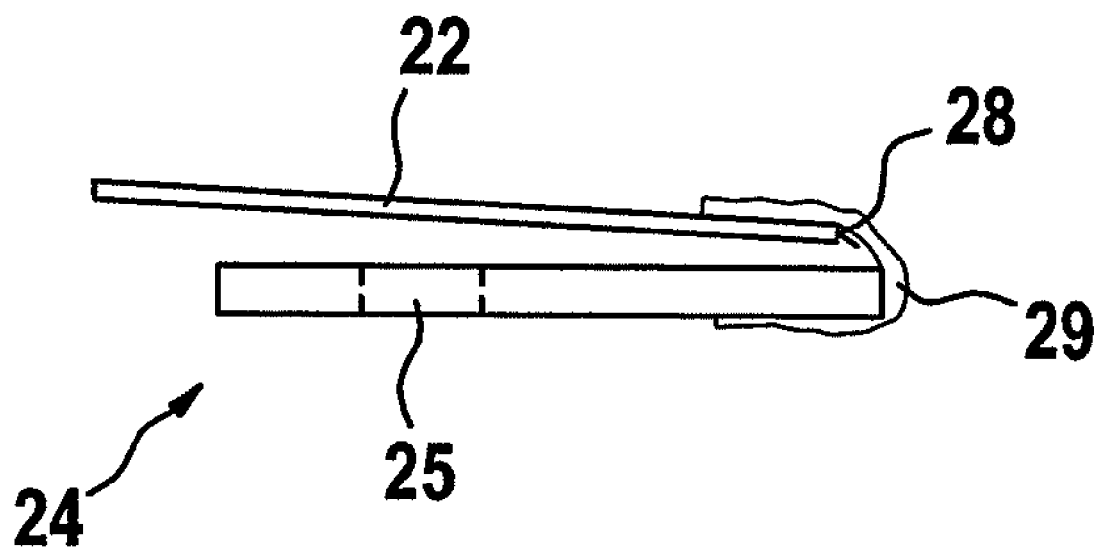

In the state fastened to the diffuser element 22 and not mounted on the reflector screen 11, the plates extend inwardly in their longitudinal extent, starting from the outer edge 28 of the diffuser element 22, in such a way that the plane defined by the plate runs substantially parallel or slightly at an angle to the plane defined by the extended diffuser element 22 (see in particular FIG. 6). In this case the transition between the diffuser element 22 and the fastening element 24 can be made by the diffuser element 22 itself or, as shown in FIG. 6, by an additional connecting means 29. In the state of the diffuser element 22 mounted on the reflector screen 11, a detail of which diffuser element 22 can be seen in particular in FIG. 4, the fastening elements 24 are braced relative to the screen spokes 17, which project at least by their closure caps 21 through the opening 25. With the short arm of the fastening element 24, which has the opening 25, the fastening element 24 is supported on the corresponding screen spoke 17. The long arm, of which the length can vary, projects beyond the light outlet opening 20 and maintains the distance A. Due to the fact that several fastening elements 24 are distributed over the circumference and preferably also located opposite each other, virtually a self-holding effect is created, which keeps the diffuser 12 free from creases and at a distance A in front of the light outlet opening 20.

The invention claimed is:

1. A diffuser for releasable fastening to a reflector screen having screen spokes, comprising:
    a diffuser element; and
    a fastening apparatus to fasten the diffuser element to the reflector screen, wherein the fastening apparatus has a plurality of fastening elements constructed and adapted to receive corresponding screen spokes of the reflector screen, wherein the fastening elements are constructed to apply a spring action and each fastening element has an opening to receive one screen spoke, wherein each fastening element comprises a rectangular plate and the opening is arranged asymmetrically in the plate to receive a respective one of the screen spokes.

2. The diffuser according to claim 1, wherein the plurality of fastening elements comprise a plurality of plate-shaped fastening elements evenly distributed over a circumference of the diffuser element and fastened thereto.

3. The diffuser according to claim 1, wherein the number of fastening elements corresponds to the number of corresponding screen spokes.

4. The diffuser according to claim 1, wherein each fastening element comprises a tensioning element.

5. The diffuser according to claim 1, wherein each fastening element comprises a single-piece element which applies the spring action.

6. The diffuser according to claim 1, wherein each fastening element comprises polycarbonate.

7. The diffuser according to claim 1, wherein the fastening elements are rigidly stitched to the diffuser element.

8. The diffuser according to claim 1, wherein the opening is arranged eccentrically in relation to the centre of the fastening element.

9. The diffuser according to claim 1, wherein the plates have a receiving section, which comprises the opening, and a holding section connected to the diffuser element (22).

10. The diffuser according to claim 9, wherein the plates are directed inwardly in their longitudinal extent, starting from an outer edge of the diffuser element, the receiving section pointing inwardly to the centre of the diffuser element.

11. The diffuser according to claim 1, wherein the opening is formed by a bore having a diameter larger than a cross-section of the screen spokes to be received.

12. A diffuser for releasable fastening to a reflector screen having screen spokes, comprising:
    a diffuser element; and
    a fastening apparatus to fasten the diffuser element to the reflector screen, wherein the fastening apparatus has a plurality of fastening elements constructed and adapted to receive corresponding screen spokes of the reflector screen, wherein the opening is arranged eccentrically in relation to the centre of the fastening element fastening elements are constructed to apply a spring action and each fastening element has an opening to receive one screen spoke and the fastening elements are rigidly stitched to the diffuser element.

* * * * *